(12) United States Patent
Korsgaard

(10) Patent No.: US 6,635,322 B1
(45) Date of Patent: Oct. 21, 2003

(54) THERMALLY INSULATING COVER STRUCTURE

(75) Inventor: Vagn Korsgaard, Hørsholm (DK)

(73) Assignee: Hygrowick-International Aps, Horsholm (DK)

( * ) Notice: Subject to any disclaimer, the term of this patent is extended or adjusted under 35 U.S.C. 154(b) by 0 days.

(21) Appl. No.: 09/504,499

(22) Filed: Feb. 15, 2000

Related U.S. Application Data

(63) Continuation-in-part of application No. PCT/DK97/00331, filed on Aug. 15, 1997.

(51) Int. Cl.[7] ............... B32B 1/08; F16L 9/00; F16L 9/14; F16L 9/16; F16L 9/17
(52) U.S. Cl. ........... 428/34.5; 428/35.9; 428/36.2; 428/36.4; 428/36.9; 428/36.91; 138/140; 138/149; 138/151; 138/152; 138/156; 138/163
(58) Field of Search ............... 428/34.5, 34.6, 428/34.7, 35.7, 35.8, 35.9, 36.1, 36.2, 36.4, 36.5, 36.9, 36.91; 138/140, 149, 151, 152, 156, 163

(56) References Cited

U.S. PATENT DOCUMENTS

| | | |
|---|---|---|
| 4,745,760 A | 5/1988 | Porter |
| 4,878,520 A | 11/1989 | Nakamura et al. |
| 5,296,287 A | 3/1994 | Ribbans |
| 5,441,083 A * | 8/1995 | Korsgaard ........... 138/147 |
| 6,026,863 A * | 2/2000 | Korsgaard ........... 138/149 |

FOREIGN PATENT DOCUMENTS

| | | |
|---|---|---|
| DE | 36 09 540 | 10/1986 |
| GB | 1284957 | 8/1972 |
| WO | WO 91/18237 | 11/1991 |
| WO | WO 97/16676 | 5/1997 |
| WO | WO 99/09346 | 2/1999 |

* cited by examiner

Primary Examiner—Cheryl A. Juska
(74) Attorney, Agent, or Firm—Thomas R. Vigil; Welsh & Katz, Ltd.

(57) ABSTRACT

A thermally insulating cover structure adapted for covering a hot pipe comprises a heat insulation layer (2), a filler layer (3) and a jacket (6), which is provided with drain openings (5). The filler layer comprises a material that is permeable to water. The drain openings are shielded against entry of water, while they allow drainage of water from the filler layer into the environment. This cover structure is in particular suited for outdoor pipelines, where moist conditions may arise. The invention also provides a pipeline and a method of providing a pipeline with a thermally insulating cover structure.

9 Claims, 1 Drawing Sheet

THERMALLY INSULATING COVER STRUCTURE

CROSS-REFERENCE TO RELATED APPLICATION

This is a continuation-in-part of International Application PCT/DK97/00331 with an international filing date of Aug. 15, 1997, which lapsed on Aug. 16, 2000.

BACKGROUND OF THE INVENTION

1. Field of the Invention

The present invention relates to a thermally insulating cover structure for covering a heated body, such as a pipe, a vessel, a tank, a valve or a fitting, which structure comprises a layer of heat insulation material covering the body and a jacket or sheathing adapted for protecting the heat insulation material against the ingress of water.

The invention further relates to a pipeline adapted for carrying a heated fluid. Further, the invention relates to a method of providing a pipe with a thermally insulating cover structure.

Heat insulation material generally serves the purpose of reducing the cost of energy needed to keep the body at the desired elevated temperature as well as the purpose of reducing the heat stress applied to the surroundings. A jacket provides protection against ingress of water and against mechanical stresses. Water or moisture inside the heat insulation is highly undesirable as it is an immediate cause of reduced thermal performance of the insulation and over time a major cause of corrosion of structural components and a cause of degradation of the insulation material.

This type of cover structure is in particular adapted for environments, where precautions against external influences such as outdoor climate, excessive humidity or mechanical loads are required. The invention is in particular, although not exclusively, useful for applications where the structure is subject to varying temperatures. This may e.g. be the case with an outdoor pipeline subject to intermittent heating due to intermittent service in carrying of heated fluids. Varying temperatures in the structure may also arise in association with pipelines in continuous service due to external factors e.g. sunshine, rain, wind, splashing with water etc. These are circumstances, which may prevail on pipelines installed in oil refineries, oil transportation and storage facilities, chemical processing plants etc.

It is widely believed that an insulation structure covering a body subject to a temperature exceeding the temperature of the surroundings will stay dry, as the heat dissipated from the body is presumed to evaporate and drive away any moisture from the insulation structure through unavoidable openings in the protection layer. However, inspections on pipeline structures subsequent to some time of service have sometimes revealed moisture or water inside the insulation material in quantities far exceeding what was expected and what could be explained. Inspections on pipeline structures have also sometimes revealed premature corrosion.

The inventor has discovered that these phenomena can be explained by the following considerations. During a phase of decreasing temperature inside the jacket, air will be sucked from the surroundings and through openings in the jacket into the insulation material. As this air will meet decreasing temperatures, the relative humidity will rise and droplets of condensed water may form at the coldest spots encountered, wherever they may be. On moist conditions in the environment, a film of water may also have been formed on the outside of the sheath, which film represents a further source from which water may be conveyed into the interior of the insulation structure along with any air sucked in. As the insulation material is not very permeable to water, at least in its undegraded state, it will tend to confine any droplets of condensed water to stay where they are.

During a subsequent phase of increasing temperature in zones of the insulation material containing liquid water, water may evaporate and may move along with the air, the insulation material being generally highly permeable to vapor and air. Some air may leave the insulation structure, possibly carrying some vapor with it. Should the air, however, before exciting the insulation structure happen to pass a zone with a relatively lower temperature, it is likely that some of the moisture will condense and stay there.

In case of an outdoor pipeline temporarily not being used, it is e.g. likely that moist air will move into the insulation material during night time, depositing droplets of water on the inside of the sheath. During daytime, the jacket heats up and water evaporates and moves along. As the pipe is now likely to be the coldest part, it will tend to accumulate a layer of condensed water, which will only be removed once the pipe is heated again. Once the pipe is heated again, water accumulated on the pipe outside will evaporate and most likely move in the form of vapor to be deposited as water droplets on the jacket inside.

In case of a pipe steadily held at an elevated temperature, temperature variations may still arise due to varying circumstances in the environment, such as rain, wind, water spray and sunshine. Any such temperature variations are likely to cause transport of moisture with the risk of water condensing and being confined inside the insulation material. Although a steadily held elevated temperature is bound to reduce the relative humidity, it brings, on the other hand, necessarily also the disadvantage of an acceleration of the corrosion process. Therefore, even a comparatively small content of water inside the insulation material may be very harmful.

2. Description of the Prior Art

U.S. Pat. No. 5,520,009 discloses a method of insulating a pipe, kept at a temperature below the temperature of the ambient air, by which method the pipe is covered with an insulating assembly, and a plug comprising capillary suction material is arranged to extend through the insulating assembly. This publication does not address the problem of removing moisture accumulated between a layer of heat insulation material and a protective jacket.

Applicant's U.S. Pat. No. 5,441,083 discloses an insulation system for insulating cold conduits and containers, which system comprises an inner layer of a water absorbing material, a heat insulating layer, a diffusion proof layer, and an outer layer of a water absorbing material, wherein the layers of a water absorbing material are in mutual contact through openings in the other layers in order that water can be transported by capillary suction. The publication does not address the problem of removing moisture accumulated between the heat insulating layer and the diffusion proof layer.

SUMMARY OF THE INVENTION

It is the object of the invention to provide a thermally insulating cover structure for covering a heated body, which cover structure overcomes the above mentioned disadvantages associated with cover structures of the prior art.

In a first aspect of the invention, this object is provided by a thermally insulating cover structure adapted for covering a surface of a heated body, comprising a heat insulation layer of a heat insulation material adapted for covering the body surface, said layer being delimited by an inner surface adapted for contacting the body surface, and by an outer surface, a filler layer comprising a material permeable to liquids and gasses, which layer is delimited by an inner surface generally contacting the outer surface of said heat insulation layer, and by an outer surface, and a protection layer providing a generally water-tight barrier adapted for protecting said filler layer against the environment, said protection layer being provided with transverse drain openings, and shield means for shielding said drain openings against entry of water while permitting water in said filler layer to cross said protection layer to be discharged to the environment by dripping or by evaporation.

In this cover structure, the heat insulation layer may comprise mineral wool, glass wool or any other heat insulation material known in the art. The filler layer may comprise a capillary active material or a more open material, e.g. a net or a granulates capable of forming a coherent net of voids, which will permit passage of liquids and gasses. With this cover structure, any moisture gathered on the inside of the protection layer will be conveyed along the filler layer to a point, where it can be drained into the environment by dripping or by evaporation.

According to a preferred embodiment, the drain openings are covered by a water absorbing, capillary material, which allows passage of water while checking passage of air. This serves to reduce circulation of air inside the cover structure.

According to another preferred embodiment, the drain openings are shielded against entry of water by means of a lip, adapted for diverting any water flowing along the outside of the protection layer as well as any water impinging from the outside. This reduces the likelihood that water from the environment will find its way into the inside of the cover structure.

According to still another preferred embodiment, the heat insulation layer together with the filler layer are adapted for providing structural support to the protection layer. This permits the use of a comparatively light protective jacket without compromising the requirement that the jacket should be capable of enduring mild accidental loads, e.g. walking, without suffering disfiguring deformations.

It is a further object of the invention to provide a pipeline, which avoids the above-mentioned problems associated with pipelines according to the prior art.

This object is achieved, according to a second aspect of the invention, by a pipeline adapted for carrying a heated fluid, said pipeline comprising a pipe adapted for conveying the heated fluid, a heat insulation layer generally enclosing said pipe and comprising a heat insulation material, a filler layer generally enclosing said heat insulation layer and comprising a material permeable to liquids and gasses, a jacket generally enclosing said filler layer and forming a generally water tight barrier, adapted for protecting said filler layer against the environment, said jacket being provided with drain openings to allow moisture from said filler layer to cross said jacket to be discharged to the environment by dripping or by evaporation, and shield means adapted for shielding said drain openings against the entry of water.

It is a still further object of the invention to provide a method of providing a pipe with a thermally insulating cover structure, which avoids the problems associated with the methods according to the prior art.

According to a third aspect of the invention, this object is fulfilled with a method of providing a pipe with a thermally insulating cover structure, said method comprising the steps of providing said pipe with a layer of heat insulation material, said layer forming a hose, which generally encloses said pipe, providing said hose with a layer of a filler material, which is permeable to liquids and gasses, said layer generally enclosing said hose, providing on the outside of said layer of filler material a generally water tight jacket, adapted for protecting said filler material against the environment, providing drain openings in said jacket adapted for allowing any moisture to cross said jacket to be discharged to the environment by dripping or by evaporation, and providing shield means adapted for shielding said drain openings against the entry of water.

BRIEF DESCRIPTION OF THE DRAWINGS

Still further objects, advantages and features of the invention will appear from the appended detailed description of preferred embodiments hereof, which is presented with reference to the accompanying drawings, whereon.

The drawings are schematic and not necessarily to scale, illustrating only features essential to enable those skilled in the art to understand and practice the invention, whereas other features have been omitted from the drawings for the sake of clarity. Throughout the drawings identical references are used to designate identical or similar features.

Figure 1:
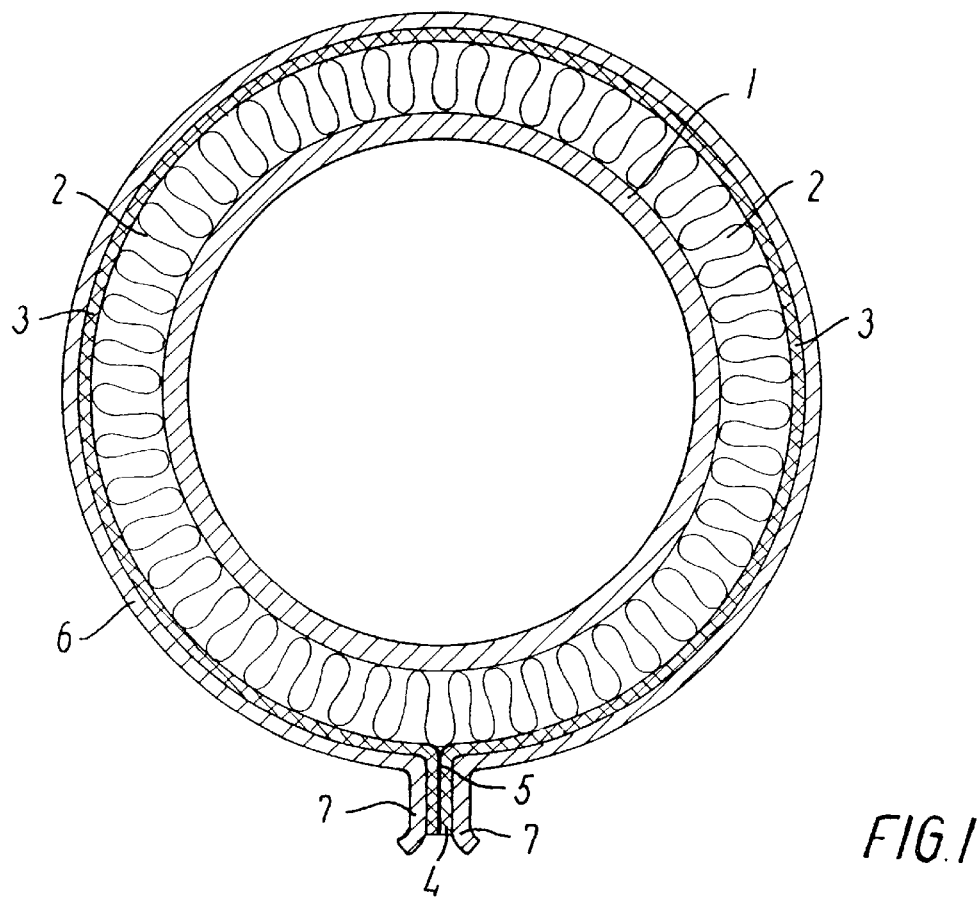
FIG. 1 shows a vertical, transverse section through a pipeline according to a first embodiment.

Reference is first made to FIG. 1, which illustrates a vertical, transverse section through a pipeline according to a first preferred embodiment of the invention.

FIG. 1 illustrates a generally horizontal pipe 1 for conveying a heated fluid. A layer 2 of insulation material such as mineral wool covers the pipe peripherally. A web of water absorbing felt is wrapped around the layer of insulation material to provide a peripheral cover layer 3, with a pair of angled edge regions 4, extending radially away from the pipe.

A web of plate material is wrapped around the layer of felt in order to provide a peripheral, protective jacket 6, with a pair of angled edge regions 7, extending radially away from the pipe with a narrow mutual spacing.

The pair of spaced edge regions defines a slit 5, accommodating the protruding edges of the felt. Rivets or the like (not shown) may be provided for interconnecting the jacket edge regions for reasons of simple securing of structural stability.

The width of the jacket edge regions should preferably be sufficient to shield the radial portions of the felt against the impact of any droplets of water. In any case the jacket edge regions should be so formed, that any water flowing along the jacket outside will be diverted from any contact with the extended portions of the felt. These requirements will generally be fulfilled for all attitudes of pipe installations, except vertical and close-to-vertical pipes, if the jacket edge regions extend radially at least equally far as the felt edge regions.

Figure 2:
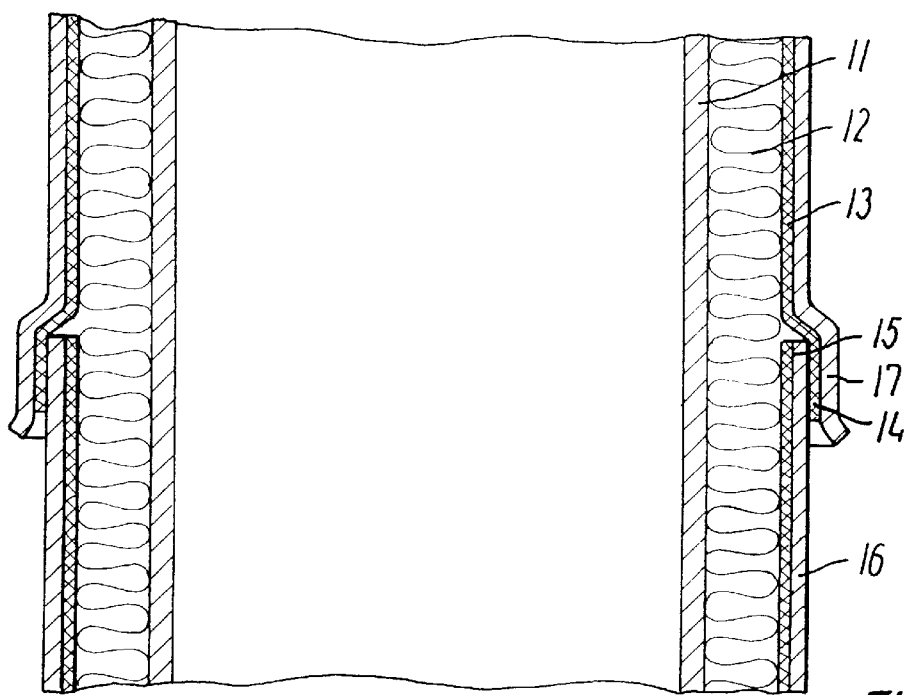
FIG. 2 shows a vertical, longitudinal section through a pipeline according to a second embodiment.

Reference is now made to FIG. 2 for an explanation of a second preferred embodiment of the invention.

FIG. 2 illustrates a vertical pipeline in a longitudinal, i.e. axial section. This figure shows a pipe 11, covered by a layer of insulation material 12. A layer of felt 13 forms a hose, covering the layer of insulation material, while a protective jacket 16 provides the peripheral finish of the structure.

FIG. 2 further illustrates peripheral gaps formed in the two outermost layers, the respective upper edge portions of which have been flared outwardly, similarly to a socket, which receives the respective, upper edge portions of the adjacent parts below. This provides an annular slit 15 in the jacket, delimited peripherally by a jacket rim 17 and through which slit a rim 14 of the felt layer crosses the jacket.

The jacket rim should preferably be sized and formed so as to shield the felt rim against any impact of water, which requirement will generally be met for vertical or inclined pipes, if the jacket generally covers the felt rim peripherally. In any case, the jacket rim should be so formed, that any water flowing down along the jacket outside will be diverted from any contact with protruding portions of the felt.

Preferred materials for the layer of insulation material comprise mineral wool, glass wool or other materials known in the art. A mineral wool of a density in the range from 20 to 200 kg/m$^3$ has been found to perform well.

Preferred materials for the filler layer comprise non-woven felt of glass fibers, polyamide fibers, or other synthetic fibers. A layer of non-woven glass fiber with a thickness in the range from 0.2 to 1.0 mm has been found to perform well. Other implementations of the filler layer comprise granular materials, wherein a capillary action is achieved by the surface contact between contacting granules, or the filler layer may comprise a wire net of steel or plastics, e.g. with a mesh size in the range from 1 mm to 20 mm.

Still another implementation of the filler layer comprises a bulk filling of small spheres, e.g. spheres With diameters in the range from 10 mm to 20 mm. In this case, it may be practical to fit spacers or supports for maintaining the jacket in the intended position.

The jacket preferably comprises a plating of galvanized steel or aluminium to a thickness in the range from 0.1 to 1.0 mm. The plating may be flat or corrugated. Any joints in the jacket should be sealed so as to generally prevent entry of water according to the circumstances expected at the site of installation.

I claim:

1. A thermally insulating cover structure adapted for covering an outer surface of a heated body, comprising three layers including:

a heat insulation layer of a heat insulation material for covering the body outer surface, said layer being delimited by an inner surface which contacts the body outer surface, and by an outer surface, a filler layer over said heat insulation layer and comprising a material permeable to liquids and gases, said filler layer permitting passage of liquids and gases therethrough, and said filler layer being delimited by an inner surface generally contacting the outer surface of said heat insulation layer, and by an outer surface, a protection layer over said filler layer providing a generally water-tight barrier adapted for protecting said filler layer against the environment, said protection layer being provided with transverse drain openings, and shield means associated with said protection layer for shielding said drain openings against entry of water while permitting water in said filler layer to cross said protection layer to be discharged to the environment by dripping or by evaporation.

2. The cover structure according to claim 1, comprising covering means for covering said drain openings, said covering means comprising a water absorbing, capillary material, for allowing passage of water while checking passage of air.

3. The cover structure according to claim 1, wherein said shield means comprises a lip of said protection layer for diverting any water flowing along the outside of said protection layer as well as any water impinging from the outside.

4. The cover structure according to claim 1, including structural support for said protection layer, said structural support being defined by said heat insulation layer and said filler.

5. The cover structure according to claim 1, wherein said filler layer comprises a water absorbing, capillary material.

6. The cover structure according to claim 1, wherein said filler layer comprises a non-woven felt.

7. The cover structure according to claim 1, wherein said filler layer comprises a net.

8. The cover structure according to claim 1, wherein said filler layer comprises a layer of separate particles for spacing said protection layer from said insulation layer while providing a net of coherent voids.

9. A thermally insulating cover structure adapted for covering an outer surface of a heated body, comprising three layers including:

a heat insulation layer of a heat insulation material for covering the body outer surface, said layer being delimited by an inner surface which contacts the body outer surface, and by an outer surface, a filler layer over said heat insulation layer and comprising a material permeable to liquids and gases, said filler layer permitting passage of liquids and gases therethrough, and said filler layer being delimited by an inner surface generally contacting the outer surface of said heat insulation layer, and by an outer surface, a protection layer over said filler layer providing a generally water-tight barrier adapted for protecting said filler layer against the environment, said protection layer being provided with transverse drain openings, and shield means associated with said protection layer for shielding said drain openings against entry of water while permitting water in said filler layer to cross said protection layer to be discharged to the environment by dripping or by evaporation, said shield means comprising a lip of said protection layer for diverting any water flowing along the outside of said protection layer as well as any water impinging from the outside.

* * * * *